_United States Patent Office_

3,231,581
Patented Jan. 25, 1966

3,231,581
IMIDAZOLINIUM DERIVATIVES
Hans S. Mannheimer, Toms River, N.J., assignor to Hans
S. Mannheimer and John J. McCabe, joint venturers
No Drawing. Filed Oct. 13, 1961, Ser. No. 144,848
6 Claims. (Cl. 260—309.6)

This invention relates to novel compositions and to methods for making them, and is directed to methods for making and to novel derivatives of certain amphoteric, water-soluble compounds characterized by having at least one

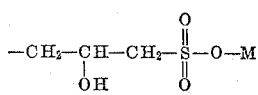

radical attached directly to a nitrogen thereof, with M being either hydrogen, sodium, potassium or other alkali metal or other cation equivalent therefor in the art of water soluble, amphoteric compounds. Said novel derivatives, hereinafter known as compounds of Formula IV may be defined as detergent sulfonic acid or sulfate salts of said amphoterics.

The amphoterics from which compounds of the present invention may be derived are themselves useful as surface active agents, have good foaming characteristics and find use as general purpose detergents, textile treating, emulsifying and emulgating agents, and also as components in cosmetics and shampoos and are of the following formula:

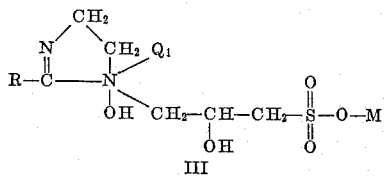

with R being a hydrocarbon radical of 6–24 carbon atoms and being aliphatic either straight or branch chain, saturated or unsaturated, cycloaliphatic, aromatic, aromatic-aliphatic or aliphatic-aromatic and $Q_1$ being an alkyl radical of 1–6 carbon atoms, hydroxy alkyl radical of 2–6 carbon atoms, or said hydroxy alkyl radicals containing 1–15 moles of an alkylene oxide adduct per hydroxy group thereof or preferably $R_1$—O—$(R_1$—O$)_x$—H wherein $R_1$ is an alkylene group of 2–4 carbon atoms, and $x$ is 0–15.

Said reactant compounds of Formula III, some of which are disclosed in my copending application 122,609, filed June 30, 1961, may be produced by following the method disclosed in the aforesaid application. One of the reactants is my novel sultone described and claimed in my copending application Ser. No. 120,921, filed on June 30, 1961, now U.S. Patent No. 3,100,779, and being of the following formula:

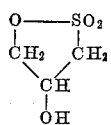

and the other reactant being a compound of the following formula:

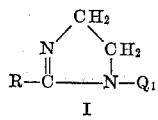

with $Q_1$ being an alkyl radical of 1–6 carbon atoms, a hydroxy alkyl radical of 2–6 carbon atoms or 1–15 mole alkylene oxide adduct of the hydroxy groups in said hydroxy alkyl radical, with said alkylene oxide being of 2–4 carbon atoms, or preferably $R_1$—O—$(R_1$—O$)_x$H in which $R_1$ is an alkylene group of 2–4 carbon atoms and $x$ is 0–15.

Said reactants of Formula I may be produced by employing methods well known to the art. Methods for producing such reactants of Formula I are disclosed in my U.S. Patent 2,528,378, of October 31, 1950, and in general comprises reacting an appropriate diamine with an appropriate monocarboxylic acid as described in my U.S. Patent 2,528,378. All of the monocarboxylic acids (R—COOH) generally described and specifically identified in said patent, and in which R is a hydrocarbon radical of 6–24 carbon atoms may be employed as reactants and examples of the diamines which may be employed as reactants therewith for the production of compounds of Formula I are amino ethyl ethanol amine $(NH_2C_2H_4NHC_2H_4OH)$ amino ethyl propanol amine $(NH_2C_2H_4NH_2C_3H_6OH)$, amino ethyl ethyl amine $(NH_2C_2H_4NH_2C_2H_5)$, amino ethyl propyl amine $(NH_2C_2H_4NH_2C_3H_6)$.

The resulting condensates produced with the formation of two moles of water are compounds of Formula I. And if desired, those having an alkanol radical may be etherified by treating with alkylene oxide to couple 1–15 moles thereof with the available hydroxy groups of said alkanol radicals. Of course, other specific methods known to the art may be used to provide certain of the compounds of Formula I, it being understood that the method for producing compounds of Formula I is not any part of the present invention.

My novel sultone employed as a reactant herein for preparing compounds of Formula III may be prepared by employing the procedure set forth in the following Example A, all parts being given by weight unless otherwise specified.

EXAMPLE A

About 104 parts of sodium meta bisulfite $Na_2S_2O_5$ were charged into a glass flask and then there was also charged into said flask 600 parts of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convert substantially all of the sodium meta bisulfite to sodium acid sulfite ($NaHSO_3$). The reactant solution of sodium acid sulfite was cooled to about 28° C. and by slow additions 101 parts of epichlorhydrin was added thereto with constant stirring over a 45 minute period, and the temperature of the mass throughout said period was controlled by external cooling thereby to maintain the temperature thereof at about 47°–50° C. throughout said period. Thereafter and for the next 2½ hours, stirring of the mass was continued and its temperature maintained at 47°–50° C. Then with or without a reflux condenser coupled with said flask, the mass therein was heated to boiling and maintained in that condition for a period of about 1 hour. Then the mass in said flask is cooled to room temperature, is hereinafter known as Mass A, and consists essentially of an aqueous solution of the novel sultone, whose structural formula is hereinbefore set forth, and NaCl by-product.

Said novel sultone may be reacted with one or a combination of two or more of said compounds of Formula I, in the mole proportion of about 1–2 moles of sultone to 1 of said compound of Formula I. Said reaction is preferably carried out in an aqueous medium and with the use of external heat to provide an aqueous solution of one or a combination of two or more compounds which are internal salts of the following Formula II:

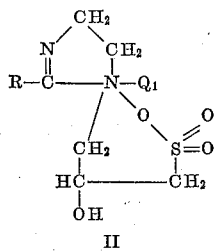

II

When a small quantity, as for example 1 cc. of said aqueous solution of a compound of Formula II is added to 100 cc. of clear tap water and shaken therewith, there is a change from clear to cloudy. This indicates its lack of water-solubility in low concentration in which said compounds normally would be used, as surface active agents. The structures thereof may be changed thereby to convert and render them water-soluble, in low concentrations, as well as high concentrations, amphoteric and further characterized by having good surface activity, detergent and wetting properties and useful in shampoos, cosmetics, in the fields of treating of textiles, etc.;

For the aforesaid purposes the novel compounds of Formula II may under alkaline conditions in an aqueous medium be heated thereby to convert them into said novel water-soluble amphoterics having the other foregoing properties and being compounds of said Formula III which are soluble in low and high concentrations in an aqueous medium.

The alkaline agent preferably employed to render said aqueous medium alkaline is an alkali metal hydroxide, such as NaOH, KOH or the like and the amount of said agent is preferably at least about 1 mole proportion thereof per mole proportion of sultone employed in the production of an aqueous solution of compounds of Formula II.

The following are illustrative methods for producing illustrative compounds of Formula III, all parts being given by weight, unless otherwise specified.

*Example 1*

Said entire Mass A which is an aqueous solution of my novel sultone, in Example A herein is heated to 80° C. and while at that temperature there are added with stirring 269 parts (1 mole) of a compound, hereinafter referred to as compound X, of the following formula:

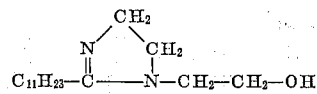

The resultant mass is then, while being stirred, allowed to stand overnight in a room whose temperature is 20° C. The next morning, the mass which has cooled to 20° C., while stirred, is heated to and maintained at 80° C. for about 3 hours, whereby there is produced an aqueous solution having a pH of 6.8 (electrically measured) of a compound of the following formula:

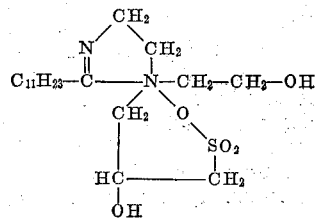

The aforesaid compound which is an internal salt is not water-soluble in low concentrations. This is evidenced when one cc. of said aqueous solution at the end of said 3 hour period is added to 100 cc. of clear tap water and shaken therewith it causes a change from clear to cloudy.

Then 88 parts of a 50% aqueous solution of NaOH is added slowly to said entire aqueous mass after said 3 hour period while constant stirring still is maintained and the entire mass is heated to and then maintained at a temperature of 75°–85° C. for a period of about 3 hours thereby to provide an aqueous solution hereinafter known as Solution 1 consisting essentially of water in which are dissolved the NaCl byproduct and Reactant III–1 of the following formula:

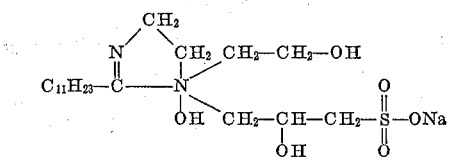

Said Reactant III–1 is water-soluble even in low concentrations as evidenced by adding 1 cc. of said Solution 1 to 100 cc. of water, which remain clear after said addition.

*Examples 2 and 3*

Employ the same procedure and components as set forth in Example 1, except that for the 269 parts of compound X employed therein, there are substituted 150 parts (.6 mole) of a capric acid derivative and 281 parts (.8 mole) of a stearic acid derivative of amino ethyl ethanol amine respectively, which are the same as the compound X except that the radical ($C_{11}H_{23}$) thereof is replaced by the respective capryl ($C_9H_{19}$) radical and the stearyl ($C_{17}H_{35}$) radical whereby there are produced Solutions 2 and 3 of Reactants III–2 and III–3 respectively, which are the same as Reactant III–1 except for the substitution of the $C_9H_{19}$ and $C_{17}H_{35}$ radicals respectively for the $C_{11}H_{23}$ radical of Reactant III–1.

*Examples 4 and 5*

Employ the same procedure and components as Example 1 except that instead of the 269 parts of compound X of Example 1 there are employed 270 and 395 parts respectively of the following respective reactants:

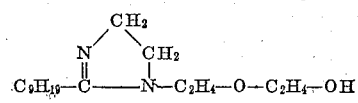

and

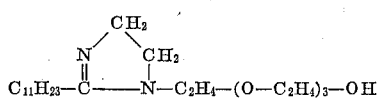

to produce aqueous solutions of Reactants III–4 and III–5 of the following respective formulas:

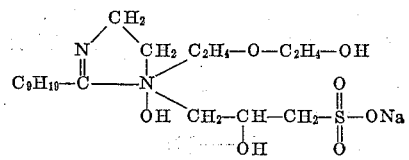

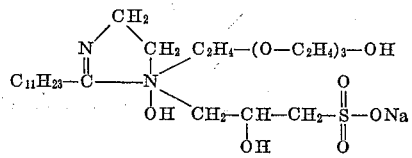

Said cycloimidine reactants employed in these Examples 4 and 5 in the production of Reactants III–4 and III–5 may be produced by etherifying compound X of Example 1 in the manners well known to the art.

Example 6

Employ the same procedure and components as those of Example 1 except that instead of the 269 parts of compound X of Example 1, there are employed 195 parts (.6 mole) of a compound of the following formula:

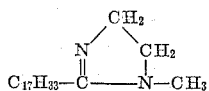

to produce an aqueous Solution 6 of Reactant III-6 of the following formula:

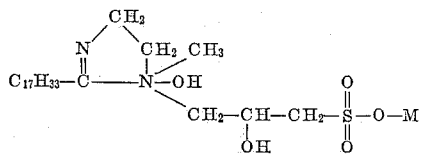

Examples 7-on

Employ the same procedure and components as those of Example 1 herein except that for the 1 mole proportion of compound X, there may be substituted .5–1 mole proportion of it or any other compound which is the same as compound X, except that for the radical $C_{11}H_{23}$ thereof, there is substituted any other hydrocarbon radical of 6–24 carbon atoms and/or for the $CH_2$—$CH_2$—OH group thereof there is substituted any of the other $Q_1$ radicals hereinbefore defined and some specific examples of which are hereinbefore set forth so that there are produced literally hundreds of different Reactants III which are of the same formula as Reactant III–1 of said Example 1 herein except that for the radical $C_{11}H_{23}$ thereof there is substituted any other hydrocarbon radical of 6–24 carbon atoms, and/or for the radical $CH_2$—$CH_2$—OH thereof, there is substituted any of the other $Q_1$ radicals.

Prior to this invention anionic detergent sulfate and sulfonate salts have been known and used. In general they are relatively cheap when compared with the cost of compounds of Formula III. In addition said anionic detergent sulfonic acid and sulfate salts have such a high toxicity as determined by standard "$LD_{50}$ toxicity test by ingestion of a single dose" as to require the use of warning labels, and also have the further disadvantage that when employed as components of shampoos cause stinging of the eyes and sometimes irritation of the skin when such shampoos are used and water solutions thereof accidentally reaches the eyes.

Examples of classes of said anionic detergent sulfonate and sulfate salts, known hereinafter as compounds of Formulas IIA are designated as G–$M_1$, with $M_1$ being an alkali metal and G being:

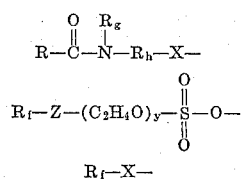

or

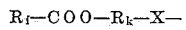

wherein R is as before defined; $R_f$ is an aliphatic, saturated or unsaturated hydrocarbon radical of 6–20 carbon atoms or an aliphatic-aromatic hydrocarbon radical with a maximum of 20 carbon atoms and having at least 6 carbon atoms in the aliphatic portion thereof; $R_g$ is hydrogen, an alkyl radical of 1–8 carbon atoms, an hydroxy alkyl radical of 2–8 carbon atoms or 1–15 mole alkylene oxide adducts of the available hydroxy groups in said hydroxy alkyl radicals, or alkyl ether group of 2–8 carbon atoms having at least 1 oxygen linkage therein and otherwise being hydrocarbon; $R_h$ is alkylene, aromatic, or aromatic-aliphatic hydrocarbon group of 1–12 carbon atoms, or hydroxy-alkylene, or 1–15 mole alkylene oxide adduct of available hydroxy groups in said hydroxyalkylene group, aliphatic unsubstituted or hydroxy substituted ether group having at least one oxygen linkage therein; $R_k$ is an alkylene group of 1–12 carbon atoms, a hydroxy alkylene group of 2–12 carbon atoms, a 1–15 mole alkylene oxide adduct of said hydroxy alkylene group, or an aliphatic unsubstituted or hydroxy substituted ether group having at least 1 oxygen linkage therein; Z being oxygen or sulfur; X being

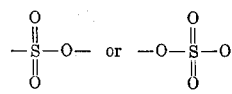

and $y$ being 1–10.

In the course of my experimentations, I have discovered that said amphoterics of Formula III could be reacted with anionic surface active agents, which are water-soluble detergent sulfonic acid salts and sulfate salts to produce water soluble reaction products of Formula IV and having the following unexpected combination of properties: (1) they are less expensive than the compounds of Formula III employed; (2) they have wetting properties somewhat less than that of the reactants so that they have a lesser tendency to leach out natural components in hair; (3) notwithstanding the general rule that the greater the size of the molecule the less it will foam, they unexpectedly exhibit better foaming and foam stability than either of the reactants; (4) they unexpectedly exhibit said better foaming and foam stability at pHs in the range of 6.5 to 8; (5) they unexpectedly are of such low toxicity that no warning labels are required as determined by said "$LD_{50}$ toxicity test by ingestion of a single dose," they are unexpectedly substantially non-stinging to the eyes and non-irritating to the skin in the same concentrations as the lowest concentrations that either the compounds of Formula III or said anionic detergents would cause stinging of the eyes and/or irritation of the skin.

According to this invention, there is first prepared an aqueous solution of (a) a compound of Formula III together with (b) one or a combination of two or more anionic compounds of Formula IIA, with the mole ratio being preferably 1–1, but may be in the mole ratio of 2 of (a) —1 of (b) to 2 of (b) —1 of (a). Then the aqueous solution which has a pH of 9 or more is heated to at least about 40° C. and generally about 40°–50° C. or above and while being maintained at such elevated temperature there is slowly added thereto a weak solution of an acidic agent, such as phosphoric, citric and preferably hydrochloric or hydroxy acetic acid under constant stirring conditions until the pH is decreased to about 8 or below to 7 for example. In this reaction, the quaternary hydroxy of the compound of Formula III combined with $M_1$ of said anionic compounds G–$M_1$ and is replaced by G thereof to provide "G" salts of compound III, which salts are the novel compounds of this invention and are of the following formula:

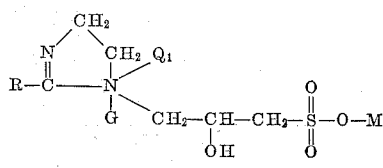

IV

One of the specific methods which is preferably employed in carrying out an aspect of this invention is to prepare an aqueous solution containing a predetermined amount of compound of Formula III. Then a predetermined amount of compound G–$M_1$ is dissolved in water in a separate container. The solutions are combined and while being constantly stirred and heated to and maintained at about 45° C. there is slowly added thereto a weak aqueous solution of hydrochloric acid until the pH thereof is approximately 7.

The following are specific examples given merely by way of illustrating the present invention and are not to be taken by way of limitation, all parts being by weight unless otherwise specified.

*Example 1–IV*

Into a reaction vessel there is charged an aqueous solution of 440 parts of Reactant III–1 in about 700 parts of water. While being constantly stirred there is added thereto an aqueous solution of 400 parts of sodium salt of lauroyl monoethanolamide sulfate:

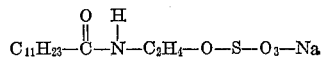

in 600 parts of water. Stirring is continued and the mass is heated to approximately 45° C. While being maintained at that temperature there is slowly added thereto weak hydrochloric acid solution until the pH thereof decreases to approximately 7. The resultant product is essentially an aqueous solution of the novel reaction product, hereinafter known as 1–IV of the following formula:

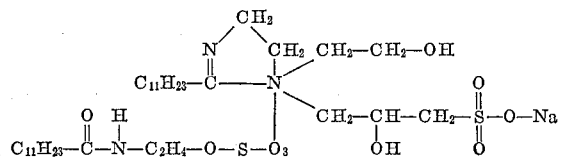

Employ the same procedure as that set forth in Example 1–IV, but employ the components set forth in the following Examples 2–IV to 16–IV on, thereby to obtain aqueous solutions of the following novel reaction products 2–IV to 16–IV-on which are illustrative examples of some of the other novel reaction products of this invention.

*Examples 2–IV—5–IV*

440 parts of Reactant III–1 in 700 parts of water. 400 parts of

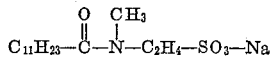

in 600 parts of water, 600 parts of $$C_9H_{19}\!-\!C_6H_4\!-\!O\!-\!(C_2H_4O)_3\!-\!SO\!-\!Na$$

in 800 parts of water, 400 parts of

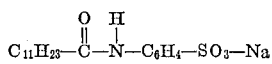

in 600 parts of water, and 450 parts of

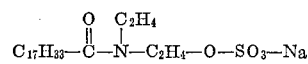

respectively there are provided respective compounds of 2–IV to 5–IV which are of the same formula as that of 1–IV except that the sulfonate or sulfate radicals of the anionic sulfonate or sulfate salts employed in these Examples 2–IV and 5–IV are respectively substituted for the sulfate radical of the formula of 1–IV.

*Examples 6–IV—7–IV*

450 parts of Reactant III–2 in 700 parts of water, 300 parts of $C_{12}H_{25}$—O—$SO_3$—Na in 450 parts of water and 320 parts of $C_{11}H_{23}C_6H_4$—$SO_3$—Na in 450 parts of water respectively. Respective novel reaction products 6–IV and 7–IV of the following formulas:

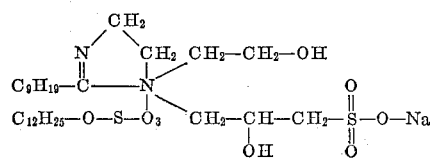

and

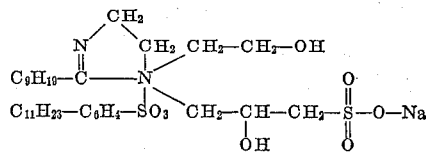

*Examples 8–IV and 9–IV*

450 parts of Reactant III–1 in 700 parts of water. 300 parts of respective compounds

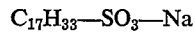

and

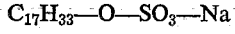

in 450 parts of water to produce novel reaction products 8–IV and 9–IV which are of the same formula as that of reaction product 1–IV except that the respective sulfonate and sulfate radicals herein are substituted for the sulfate radial of product 1–IV.

*Example 10–IV*

440 parts of Reactant III–1 in 700 parts of water. 370 parts of $C_{13}H_{27}$—O—$(C_2H_4O)_3$—$SO_3$—Na in 500 parts of water to provide novel reaction product 10–IV same as 1–IV except sulfate radical herein is substituted for that of product 1–IV.

*Examples 11–IV and 12–IV*

500 parts of Reactant III–3 in 750 parts of water. 310 parts of $C_{11}H_{23}$—COO—$C_2H_4$—$SO_3$—Na in 450 parts of water and 370 parts of $$C_{11}H_{23}\!-\!COO\!-\!CH_2\!-\!CHOHCH_2\!-\!O\!-\!SO_3\!-\!Na$$

in 500 parts of water respectively. The respective novel reaction products 8–IV and 9–IV are:

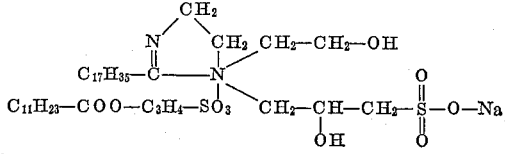

and

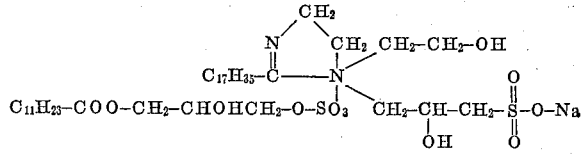

*Example 13–IV*

500 parts of Reactant III–5 in 750 parts of water. 350 parts of $C_{12}H_{25}$—O—$SO_3$—Na in 440 parts of water to provide novel reaction product 14–IV of the formula:

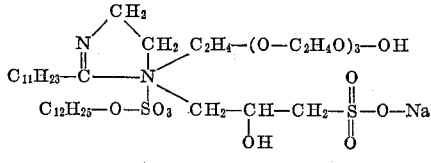

*Example 15–IV*

440 parts of Reactant III–1 in 650 parts of water. 250 parts of $C_6H_{13}$—S—$C_2H_4OSO_3$—Na in 400 parts of water to provide novel reaction product 15–IV of the same formula as that of Example 1 except that the sulfate radical herein is substituted for that of product 1–IV.

*Examples 16–IV-on*

Employ about 1 mole proportion of all of the other specific compounds of Formula III specifically described in Examples 1 to 7-on herein respectively in about one and one half times its weight of water and about 1 mole proportion of any of the specific anionic surface active agents (G–M₁) respectively in about one and one half times its weight of water there are produced literally thousands of compounds of the Formula IV herein which compounds differ from the specific compounds of Examples 1-IV to 15-IV herein and are other specific compounds of the present invention. Specific illustrative examples of other anionic reactants are the other anionic sulfate and sulfonate salts disclosed in my U.S. Patent 2,781,349 and the following is at least a partial list thereof:

$C_{11}H_{23}CONC_2H_4OHC_2H_4OSO_3Na$
$C_{11}H_{23}CONH(C_2H_4O)_3SO_3Na$
$C_{11}H_{23}CONHC_2H_4SO_3Na$
$C_{11}H_{23}CONHC_2H_4NHCOCH_2SO_3Na$
$C_{11}H_{23}C_6H_4OSO_3Na$
$C_{10}H_{21}OC_2H_4OSO_3Na$
$C_6H_{13}OC_2H_4OSO_3Na$
$C_8H_{17}C_6H_4O(C_2H_4O)_4SO_3Na$
$C_{11}H_{23}OC_2H_4OSO_3Na$
$C_{11}H_{23}O(C_2H_4O)_3SO_3Na$
$C_{12}H_{25}SO_3Na$
$C_9H_{19}SO_3Na$
$C_{11}H_{23}COOC_2H_4NHCOCH_2SO_3Na$
$C_9H_{19}C_6H_4COO(C_2H_4O)_3SO_3Na$
$C_{11}H_{23}COOC_2H_4OSO_3Na$
$C_{11}H_{23}COOC_4H_8SO_3K$

It is to be understood that as to the G radicals which terminate in X and the novel reaction products thereof when either SO₃ or OSO₃ is used in the specification or claims, it is meant to indicate either one or the other because of their equivalency and that the use of Na in compounds of this invention as set forth in the specification and claims is means to indicate it, hydrogen any of the other alkali metals or other cation equivalents which obviously may be substituted for sodium.

It is to be understood that the following claims are intended to cover all the generic and specific features of the invention herein described and all statements of the scope of the invention which as a matter of language might be said to fall therebetween.

I claim:

1. A compound of the formula:

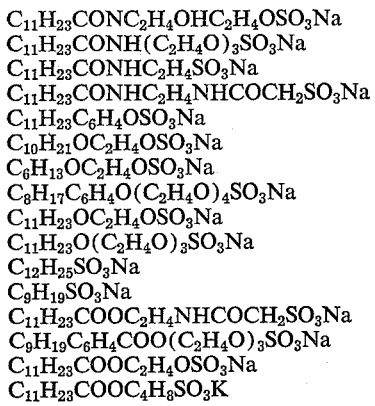

with R being a hydrocarbon radical of 6–24 carbon atoms; $R_f$ being a hydrocarbon radical selected from the group consisting of aliphatic hydrocarbon radicals of 6–20 carbon atoms and aliphatic-aromatic hydrocarbon radicals with a maximum of 20 carbon atoms and having at least 6 carbon atoms in the aliphatic portion thereof; $Q_1$ is a radical selected from the group consisting of alkyl radicals of 1–6 carbon atoms, hydroxy alkyl radicals of 2–6 carbon atoms and 1–15 mole alkylene oxide adducts of the hydroxy groups in said hydroxy alkyl radicals, said alkylene oxide being of 2–4 carbon atoms.

2. A compound of the formula:

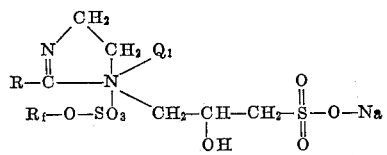

with R being a hydrocarbon radical of 6–24 carbon atoms; $R_f$ being a hydrocarbon radical selected from the group consisting of aliphatic hydrocarbon radicals of 6–20 carbon atoms and aliphatic-aromatic hydrocarbon radicals with a maximum of 20 carbon atoms and having at least 6 carbon atoms in the aliphatic portion thereof; $Q_1$ is a radical selected from the group consisting of alkyl radicals of 1–6 carbon atoms, hydroxy alkyl radicals of 2–6 carbon atoms and 1–15 mole alkylene oxide adducts of the hydroxy groups in said hydroxy alkyl radicals, said alkylene oxide being of 2–4 carbon atoms, y being 1–10.

3. A compound of the formula:

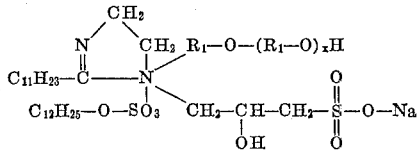

with $R_1$ being an alkylene radical of 2–4 carbon atoms; and $x$ is 0–15.

4. A compound of the formula:

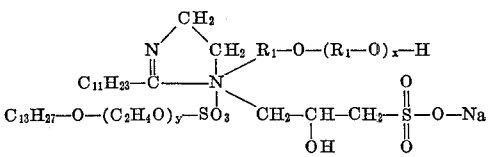

with $R_1$ being an alkylene radical of 2–4 carbon atoms, $x$ being 0–15 and $y$ being 1–10.

5. A compound of the formula:

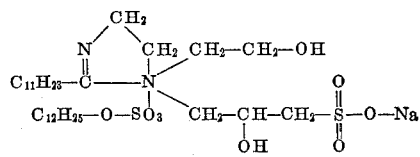

6. A compound of the formula:

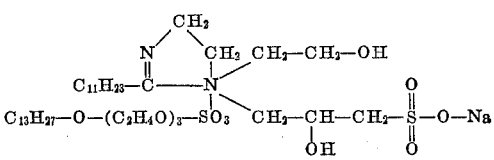

References Cited by the Examiner

UNITED STATES PATENTS

| | | | |
|---|---|---|---|
| 2,154,922 | 4/1939 | Waldmann et al. | 260—309.6 |
| 2,528,378 | 10/1950 | Mannheimer | 260—309.6 |
| 2,697,116 | 12/1954 | Stayner | 260—501 |
| 2,697,656 | 12/1954 | Stayner et al. | 260—501 |
| 2,781,357 | 2/1957 | Mannheimer | 260—309.6 |
| 2,781,358 | 2/1957 | Mannheimer | 260—309.6 |

FOREIGN PATENTS 772,223  4/1957  Great Britain.

WALTER A. MODANCE, *Primary Examiner.*

DUVAL T. McCUTCHEN, *Examiner.*